(12) United States Patent
Lancaster

(10) Patent No.: US 7,231,831 B1
(45) Date of Patent: Jun. 19, 2007

(54) MANIFOLD VALVE AND PRESSURE TRANSDUCER ASSEMBLY

(75) Inventor: Michael F. Lancaster, Middleburg Heights, OH (US)

(73) Assignee: Noshok, Inc., Berea, OH (US)

( * ) Notice: Subject to any disclaimer, the term of this patent is extended or adjusted under 35 U.S.C. 154(b) by 0 days.

(21) Appl. No.: 11/332,905

(22) Filed: Jan. 17, 2006

(51) Int. Cl.
*G05D 16/00* (2006.01)
(52) U.S. Cl. .................................. 73/756; 137/15.09
(58) Field of Classification Search ................ 73/756, 73/119; 137/360, 15.09
See application file for complete search history.

(56) References Cited

U.S. PATENT DOCUMENTS

| | | | |
|---|---|---|---|
| 4,221,134 A | 9/1980 | Ekstrom | |
| 4,466,290 A | 8/1984 | Frick | |
| 4,738,276 A * | 4/1988 | Adams | 137/343 |
| 4,865,360 A | 9/1989 | Adams | |
| 4,879,912 A | 11/1989 | Suckow | |
| 4,977,917 A * | 12/1990 | Adams | 137/597 |
| RE34,610 E | 5/1994 | Miller | |
| 5,725,024 A | 3/1998 | Nimberger | |
| 5,988,203 A | 11/1999 | Hutton | |
| 6,279,401 B1 | 8/2001 | Karas | |
| 6,349,735 B2 | 2/2002 | Gul | |
| 6,389,904 B1 | 5/2002 | Petrich | |
| 6,484,587 B2 | 11/2002 | Gul | |
| 6,622,573 B2 | 9/2003 | Kleven | |
| 6,675,655 B2 | 1/2004 | Broden | |
| 6,866,654 B2 * | 3/2005 | Callan et al. | 604/247 |
| 2001/0032516 A1 * | 10/2001 | Gul | 73/756 |
| 2001/0039964 A1 * | 11/2001 | Gul | 137/360 |

* cited by examiner

*Primary Examiner*—Andre J. Allen
(74) *Attorney, Agent, or Firm*—Ulmer & Berne LLP; Charles A. Crehore (57) ABSTRACT

An assembly for measuring differential pressures includes a manifold valve and pressure transducer assembly including two pressure transducers. The manifold valve includes two pressure inlet ports and two pressure outlet ports that communicate through the manifold's isolation valves. An equalization valve connects the two pressure lines. Mating flanges on the manifold valve and pressure transducer assembly are bolted together to form a pressure tight seal between the manifold valve outlet ports and the pressure transducer assembly inlet ports. The pressure transducer assembly also includes a mounting plate for supporting the pressure transducers. The transducers generate an electrical signal corresponding to inlet pressure. Signals from pressure transducers and an optional thermistor for each are wired to an electrical connector mounted on the side of the assembly. The signals are electronically compared with an external signal processing circuit that outputs a representative signal of the differential pressure.

20 Claims, 4 Drawing Sheets

MANIFOLD VALVE AND PRESSURE TRANSDUCER ASSEMBLY

BACKGROUND OF THE INVENTION

The present invention relates to manifold valves and pressure transducers in fluid communication with main fluid pressure lines, and more particularly to assemblies of manifold valves and pressure transducers for outputting signals representing pressures in two pressurized fluid lines.

Manifold valves are known in the art. Manifold valves typically are mounted between the main fluid pressure lines and the pressure transducers. Manifold valves permit isolating the pressure lines from the pressure transducers in order to facilitate their removal or replacement and are required for calibration purposes. The manifold valve of the present invention includes a first inlet port and a second inlet port with internal passageways that run past isolation valves to a first outlet port and second outlet port that are connected to corresponding inlet ports on the pressure transducers.

Differential pressure transmitters are known in the art. Manifold valves are used in conjunction with differential pressure transmitters. The manifold valve in the present invention has an integral flange that mates with differential pressure transmitters as in U.S. Pat. No. 6,279,401 B1, incorporated herein by reference in its entirety. The flange connection is standard in the industry and is used to directly mount a manifold valve to a differential pressure transmitter without the use of piping components. Differential pressure transmitters of this type include pressure-sensing components, which include pressure transducers, with signal processing circuits and are typically manufactured as a complete unit. The signal processing circuit of the differential pressure transmitters combines the low-pressure and high-pressure output signals of the pressure sensors into a single output signal that is indicative of the pressure difference. The costs of these types of transmitters typically are higher than the cost of the manifold valve.

Fully integrated manifold valves and differential pressure transmitters also are known in the art. They typically combine a manifold valve and differential pressure transmitter into a single manufactured unit. U.S. Pat. No. 4,865,360, incorporated herein by reference in its entirety, relates to this type of fully integrated assembly. The time required to assemble these units into fluid pipelines is significantly lower than assembling separate manifold and pressure transducers, but the costs of these units also are higher.

Pressure transducers, manifold valves and signal processing circuits can be purchased on a stand-alone basis and assembled using standard piping components. The costs of the individual components are relatively low, but the costs associated with assembling them into fluid pipelines are significantly higher than integrated units. An optimal manifold valve and differential pressure transmitter assembly would use low cost standard components that can be assembled rapidly using a minimal amount of piping components. Known manifold valve and differential pressure transmitter assemblies have attempted to accomplish this. U.S. Pat. No. 6,349,735 B2, incorporated herein by reference in its entirety, relates to an example of this type of assembly. This assembly, however, still makes use of piping components, and although the manifold valve is modular, the pressure transducers are not.

Further, U.S. Pat. No. 4,466,290, incorporated herein by reference in its entirety, relates to a differential pressure transmitter attached to a three valve manifold employing a standard mounting flange used in the industry and incorporated between a three valve manifold and a single transmitter.

Further improvements are needed that make use of standard low cost, interchangeable components that can be quickly assembled with the same functionality as their more expensive counterparts.

SUMMARY OF INVENTION

The present invention provides a novel means for monitoring the pressure in a fluid pipeline. The pressure indicating assembly uses a manifold valve assembly and a pressure transducer assembly comprising two pressure transducers. These components are attached in a unique way so as to allow accessibility and interchangeability with commercially available transducers and manifold valve assemblies. The invention improves on known assembly and mounting means between the pressure transducers and the manifold valve.

One object of this invention is to provide a compact, weather-tight enclosure for the pressure transducers that will mount to a standard manifold flange bolting arrangement and be sized to align the manifold outlet ports with the pressure transducers' inlet ports.

A further object of this invention is that the transducer assembly enclosure be a simple two-piece design composed of a housing and a mounting plate that can be completely potted for use in an explosive atmosphere.

Other objects of this invention are that the transducer mounting plate locates, seals, and secures the transducers with respect to the outlet port of the manifold valve, and that the transducer mounting plate minimizes the distance between the main fluid pressure line and the transducers.

Further objects of this invention are that the mounting plate be sandwiched between the manifold valve flange and the transducer housing and that it is free to align itself parallel with the flange seals upon tightening the bolts into the transducer housing.

It is a further object of this invention to provide a single electrical connector secured to the side of the transducer housing in order to attach a cable to a variety of modular signal processing circuits. Signals from thermistors mounted on the transducer mounting plate also are sent through this connector. Space is provided in the transducer housing for adding internal signal processing circuits in order to convert it to a differential pressure transmitter.

The present invention's compact design and novel assembly along with other features and advantages will be apparent from the following drawings and detailed description.

DETAILED DESCRIPTION

Figure 1:
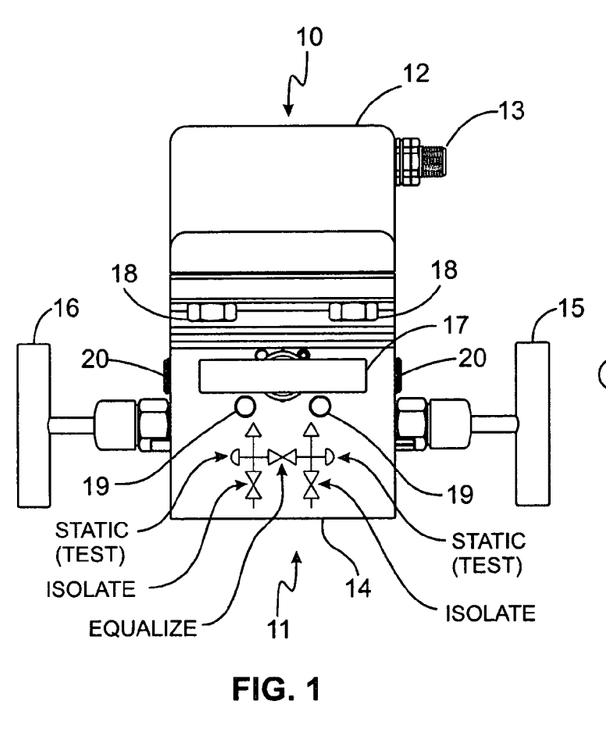
FIG. 1 is a top view of the manifold valve and pressure transducer assembly including a schematic of the manifold valve operation.
Figure 2:
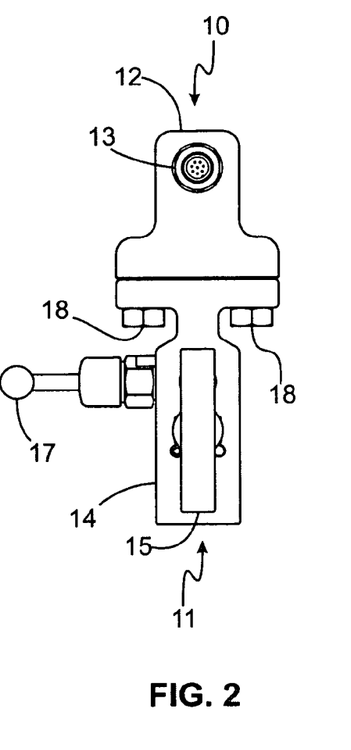
FIG. 2 is a right side view of FIG. 1 showing the manifold valve and pressure transducer assembly.

A preferred embodiment is shown in FIG. 1 of an improved manifold valve and pressure transducer assembly consisting of a manifold assembly 11 detachably mounted with four bolts 18 to a pressure transducer assembly 10. Two of said bolts 18 are shown in FIGS. 1 and 2, and all four bolts 18 are shown in FIG. 4. Attached to the manifold valve body 14 are two isolation valves 15 and 16 that are used to open and close two segregated fluid passageways between two inlet ports 21 of FIG. 3 and two outlet ports 22 of FIG. 4. The inlet ports 21 are shown as threaded connections but can be any convenient attachment to a fluid pipeline. When mounted to additional manifold valves, the inlet ports 21 can be a flange type similar to the flange connection on the two outlet ports 22 of the manifold body 14. The flange connection has been adopted by the Manufacturers Standardization Society of the Valve and Fitting Industry (MSS) SP-99 as a standard and is considered a direct mounting connection. This connection eliminates the need for pipe fittings and is utilized in the present invention. Upstream from and between isolation valves 15 and 16 is a passageway joining the segregated fluid passageways that can be opened or closed with an optional equalizing valve 17. Also, intersecting the passageway between the isolation valves 15 and 16 and the outlet ports 22 are two plugged and threaded bleed ports 20 for attaching a means for testing or venting each fluid passageway. Each valve 15, 16 and 17 has a handle that is attached to a flow isolation member known in the art as a stem. These items are attached to the manifold body 14 with a member known in the art as a bonnet. Within the manifold body 14, two mounting holes 19 are provided to secure the assembly to a supporting structure. An operational schematic, showing hydraulic symbols known in the art, depicts the function of the manifold valve assembly 11 shown in FIG. 1.

The manifold valve assembly 11 in the preferred embodiment typically incorporates an extruded stainless steel manifold body 14. The manifold body 14 in the preferred embodiment is further enhanced by a secondary cold drawn process. Cold drawing the shape produces a dimensionally accurate part with smooth, flat surfaces without the need for extra machining. The flange connection on the manifold body 14 would be a costly feature to produce without the use of an extruded shape. The stainless steel material is selected for its strength and corrosion-resistant properties and is compatible with a wide range of industrial fluids. Alternate materials can be used depending on the types of fluids and operating pressures used, as is well known to those skilled in the art. Such materials can include plated steel, titanium and nickel based alloys.

Figure 3:
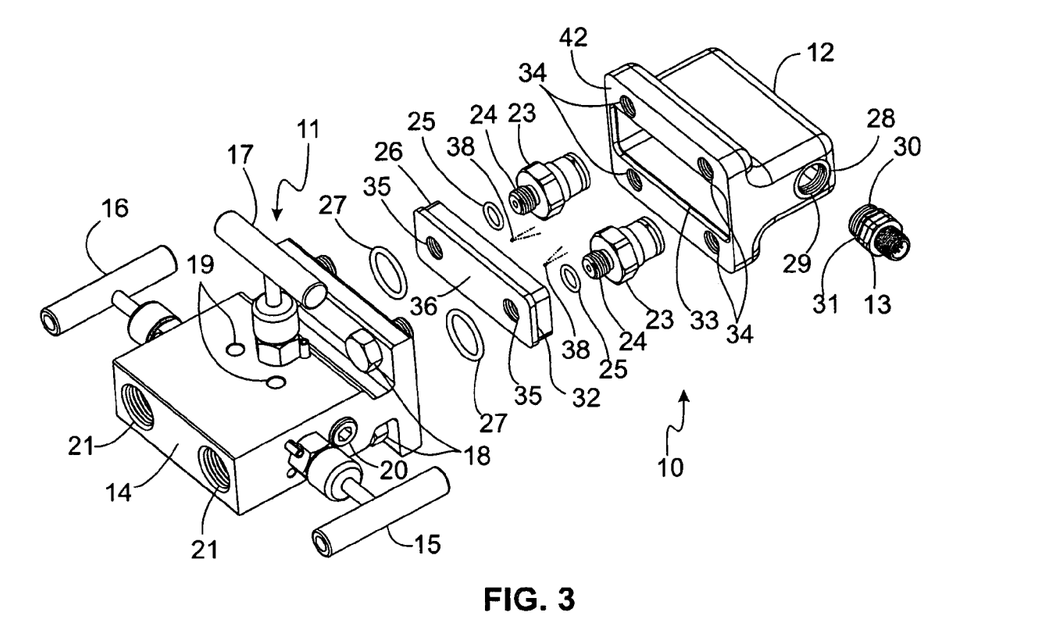
FIG. 3 is a front perspective view of the manifold with the transducer assembly fully exploded.
Figure 4:
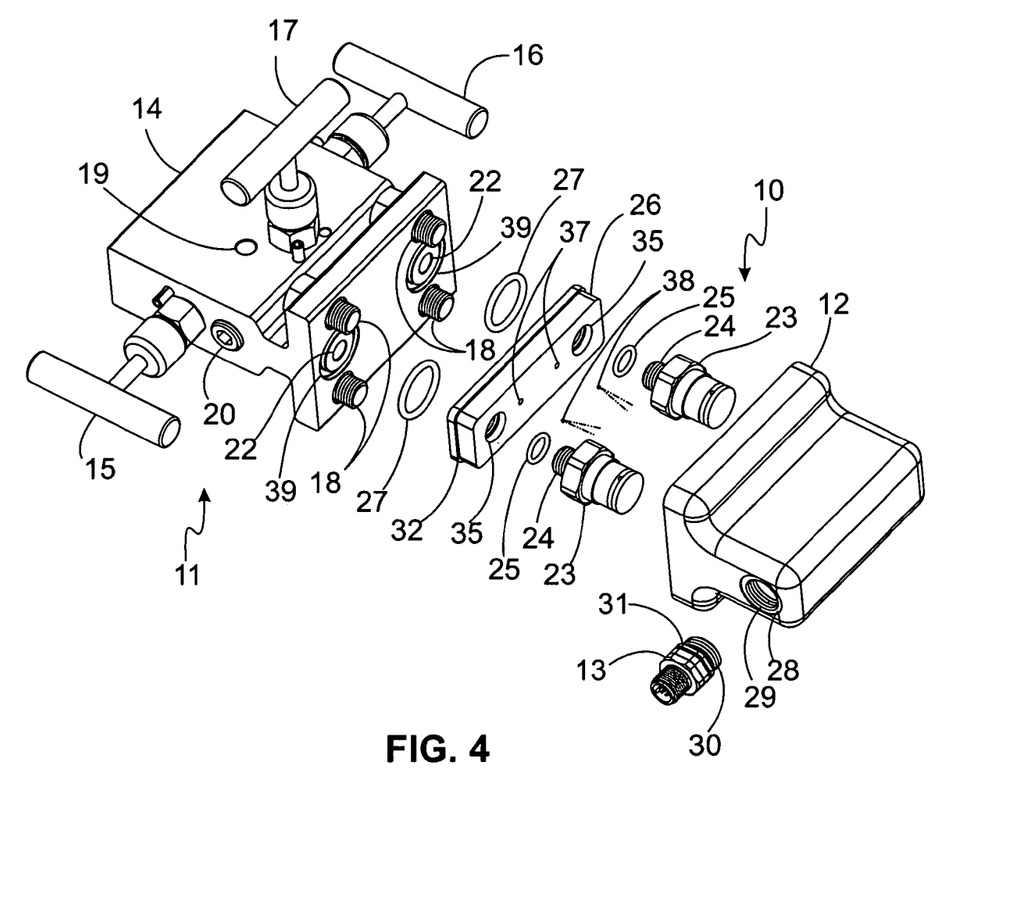
FIG. 4 is a rear perspective view of the manifold with the transducer assembly fully exploded.
Figure 5:
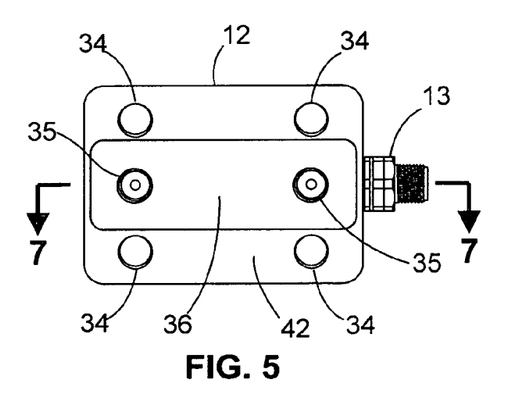
FIG. 5 is a front view of the transducer assembly.

In operation, the manifold valve assembly 11 is used to control the flow of fluid from two pressurized fluid lines into the two pressure transducers 23 as shown in FIG. 3. The procedure for placing the assembly shown in FIG. 1 into service includes closing all valves 15, 16 and 17, attaching fluid pressure lines to inlet ports 21, and then slowly opening the isolation valves 15 and 16 to the fully opened position. Keeping the equalization valve 17 closed allows either of the two inlet ports 21 of the manifold to be a high- or low-pressure line, and a differential pressure reading can be taken between the two lines. If bleed valves are connected to the two bleed ports 20, the lines would be bled at this time. Because the distance to the pressure transducer is short, little air is entrapped in the valve, and in most cases no bleeding is required. To remove the transducer assembly 10 from service, the isolation valves 15 and 16 are closed, and the equalizing valve 17 is opened to normalize the pressure between the segregated fluid pressure lines. A single test port 20 is cracked open to bleed the pressure between the isolation valves 15 and 16 and the two pressure transducers 23, and then the transducer assembly 10 can be unbolted from the manifold assembly 11.

The manifold valve assembly 11 can be supplied without the optional equalization valve 17. The equalization valve 17 can be provided for the convenience of bleeding and calibrating the assembly. Because the manifold body 14 provides a test port 20 upstream of each isolation valve 15 and 16, removal of the transducer assembly 10 without an equalization valve 17 would require that both bleed ports 20 be bled instead of one. Both transducers 23 can be calibrated using one of pressure inlet ports 21 in a manifold assembly 11 that has an equalization valve 17. Closing an isolation valve 15 or 16 on an unused inlet port 21 and opening the equalization valve 17 accomplishes this. Without an equalization valve 17, both inlet ports 21 would need to be pressurized.

It is important that the equalization valve 17 does not leak during in-service operation. If a leak occurs, the true differential pressure that exists between the high- and low-pressure lines would be compromised, and the reading of the differential pressure would be false. Leaks are more likely to occur as the differential pressure increases. Using a manifold assembly 11 with or without an equalization valve 17 would be a choice between adding convenience and removing a potential leak path. Additionally, the manifold valve assembly 11 can be manufactured without bleed ports 20 on pressurized fluid systems that do not require bleeding or have alternate methods of bleeding. Removing the bleed ports 20 would also remove a potential leak path.

Figure 7:
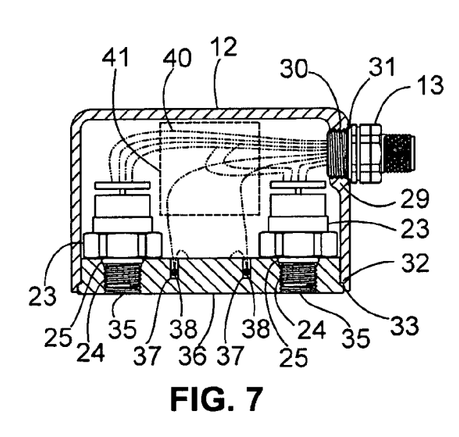
FIG. 7 is a top view of FIG. 5 of the transducer assembly, partially in cross section.

The exterior components of the pressure transducer assembly 10 consist of a pressure transducer housing 12 and a pressure transducer mounting plate 26 as shown in FIGS. 3 and 4. These two components can be customized to fit a variety of pressure transducers 23 and electrical connectors 13 mounted to their surfaces. The interior components as shown in FIG. 7 consist of two pressure transducers 23 and two thermistors 38 connected by wiring 41 to the electrical connector 13. The pressure transducer assembly typically is designed to connect to an external signal processing circuit (not shown) that compares the signal from the two pressure transducers 23 and outputs a signal that represents the difference between the two pressure transducers. This is known in the art as a differential pressure transmitter. To convert the pressure transducer assembly into a differential pressure transmitter, the signal processing circuit is incorporated into the interior space 41 and the electrical connector 13 is changed accordingly.

Figure 6:
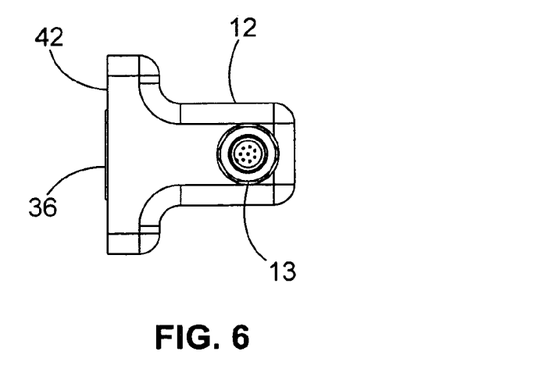
FIG. 6 is a right side view of FIG. 5

The pressure transducer housing 12 typically is a rigid cast stainless steel structure with a minimum wall thickness of $\frac{1}{8}$". On one side of the transducer housing 12, a $\frac{1}{4}$" thick section is cast into the housing for machining a threaded port 29 for attachment of an electrical connector 13 as shown in FIG. 6 and FIG. 7. A recess 28 on the exterior of the threaded port 29 provides a smooth flat sealing surface for an o-ring seal as shown in FIG. 4. The pressure transducer housing has a fixed bolt hole pattern 34 (for example, $2\frac{1}{8}$"×$1\frac{5}{8}$") that matches the standard spacing of the flange bolts 18 on the manifold body 14. Because the bolting pattern is symmetrical about its centerline, the transducer assembly 10 can be installed with the electrical connector 13 protruding from the left or right side of the manifold assembly 11. In a preferred embodiment, the pressure transducer housing 12 has a bolting face 42 that does not exceed the size of the flange on the manifold body 14. In a preferred embodiment, the bolting face is 3⅜" wide×2⁷⁄₁₆ high. In a preferred embodiment, the bolting face 42 extends beyond the ends of the bolts 18 in order to produce blind threaded holes 34. Thereafter, the transducer housing 12 can be reduced to 3⅜" wide×1¼" high, which is the minimum space needed for the pressure transducers 23 and electrical connector 13. This saves in material use and minimizes the interior space required if the pressure transducer assembly is potted as described hereinafter. Blind threaded holes also protect the bolt 18 threads from corrosion and potential damage that might occur if they were exposed to the environment.

Figure 8:
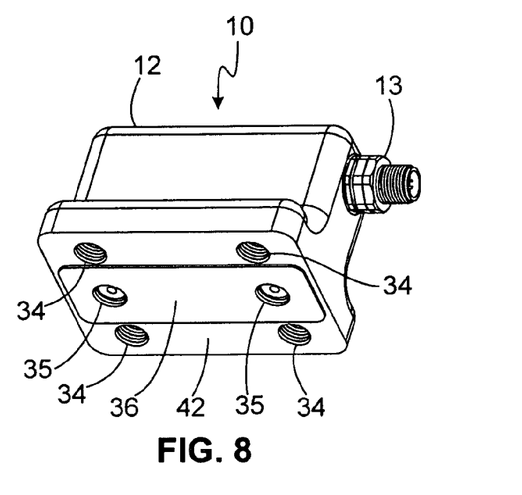
FIG. 8 is a front perspective view of the pressure transducer assembly.

The transducer mounting plate 26 has a smooth flat sealing surface 36 that is designed in a preferred embodiment to extend ¹⁄₃₂" above the bolting face 42 of the pressure transducer housing 12 and is sized to cover the o-ring grooves 39 on the manifold body 14 as shown in FIGS. 3, 4, 6 and 8. The extension of this surface 36 ensures that it is the only surface to contact the manifold body flange 14 during assembly. The mounting plate 26 thickness is also designed to extend beyond the end of the pressure transducer 23 by a few threads as shown in FIG. 8. The extra threads can be utilized for inserting a threaded removal tool in case the mounting plate cannot be easily removed from the transducer housing 12. The mounting plate 26 has a lip 32 running around its perimeter that mates with a recess 33 on the transducer housing 12 as shown in FIG. 3. In a preferred embodiment, the standard spacing between the outlet ports 22 of the manifold assembly 11 is 2⅛", and the transducer mounting plate 26 provides threaded transducer port holes 35 with the same spacing. A preferred pressure transducer mounting plate 26 has SAE J1926 o-ring boss ports 35 that mate with the pressure transducers 23. Alternatively, the mounting plate 26 can have NPT threads or any threaded port that mates with the pressure transducers.

In a preferred embodiment, the sensing technology in the pressure transducers 23 is a thin-film type. The thin-film pressure sensors are selected for their high accuracy, good zero point stability and small temperature errors. The sensor element comprises a cylindrical stainless steel can with a thin end that takes the form of a diaphragm. On the diaphragm is a Wheatstone bridge that is atomically bonded to the stainless diaphragm by methods known to those skilled in the art. This type of sensor is preferred over diffused silicon semiconductors that use a pressure transmitting fluid between the diaphragm and the sensor because complete media separation is achieved without the use of a pressure transmitting fluid. It is also preferred that the thin-film sensor be welded to the transducer pressure port to avoid additional leak paths that may occur with o-rings or adhesive seals.

The pressure transducers' 23 compact size is ideal for mounting in the limited space as shown in FIG. 7. In a preferred embodiment, the pressure transducer 23 has a 22 mm hex body shape and is 21 mm long excluding the connection length. If longer transducers are used, the transducer housing 12 would be lengthened accordingly. To ease installation, the pressure transducers 23 have a SAE J1926 straight threaded connection 24. This standard thread has a groove between the threads 24 and the hex body of pressure transducer 23 for installing o-rings 25. Alternately, if fluid compatibilities, temperatures, or pressures do not allow for o-ring seals, the thread can be a national tapered pipe thread (NPT) which has a metal to metal seal.

Two thermistors 38 are installed in holes 37 next to each pressure transducer port 35 on the pressure transducer mounting plate 26. The holes 37 are sized according to the size of the thermistors 38. The thermistors 38 are installed to provide feedback of the thermal conditions surrounding the pressure transducers. In a preferred embodiment, the pressure transducers 23 provide integrated temperature compensation within their normal operating temperatures. This compensation insures a linear response to the pressure. To further increase the accuracy of the compensation and to compensate outside the normal operating temperatures, the signals from the thermistors are used in the signal processing circuits.

The electrical connector 13 can be any commercially available connector with a threaded panel mounting feature 30 and a seal 31 feature with the desired amount of leads for connection to the internal components. In a preferred embodiment, the electrical connector comprises 8 leads. The electrical connector of that preferred embodiment is available from Turck Inc. of Minneapolis, Minn. under part number "Eurofast FSD 8-0.5".

The pressure transducer assembly 10 can be mated to and held together by the manifold assembly 11 in several steps. The pressure transducers 23 are screwed into the mounting plate 26 until the o-rings 25 are seated in the o-ring ports 35. The thermistors 38 are inserted into the pressure transducer mounting plate holes 37 and covered with a silicone RTV sealant. The electrical wire leads 40 on the electrical connector 13 are drawn through the threaded hole 29 and connected to the appropriate leads on the pressure transducers 23 and thermistors 38. The pressure transducer mounting plate 26 is then inserted into the pressure transducer housing 12, and the electrical connector 13 is screwed into the pressure transducer housing 12. Two o-ring seals 27 are inserted into the manifold body flange grooves 39. The assembled transducer is placed onto the manifold body flange 14 and the bolts 18 are tightened in a criss-cross pattern, i.e., by tightening one bolt 18 partially and then another diagonally across from it, and continuing tightening alternatively until tightening is complete. As noted earlier, the pressure transducer mounting plate 26 extends beyond the transducers' housing so a gap (¹⁄₃₂" in a preferred embodiment) exists between the manifold body flange 14 and the pressure transducer housing 12. While tightening the bolts, the transducer mounting plate 26 is pulled toward the manifold body 14 flange connection by the small contact area between the edge of the transducer housing recess 33 and the lip 32 of the transducer mounting plate 26. The transducer mounting plate 26 levels itself parallel with the manifold body 14 flange connection due to the small amount of deformation induced on transducer housing recess 33. This metal-to-metal contact is all that is required to seal the pressure transducer mounting plate 26 to the pressure transducer housing 12. The contact pressure also maintains a seal between the transducer mounting plate 26 and the flange o-rings 27. The transducer mounting plate essentially floats or is sandwiched between these two seals. The internal components of the transducer assembly 10 can be easily accessed for repair or exchanged for alternate components by simply removing it from the manifold assembly 11.

The pressure transducer assembly 10 can also be fully potted. Potting is used to permanently seal the internal components from external environments. A preferred embodiment uses a two-component polyurethane potting compound known to those skilled in the art, such as sold under the trade name of APT028/42/1 by GISMA GmbH. Potting can be accomplished by simply unscrewing the electrical connector 13 from the transducer housing 12 while the transducer assembly is secured to the manifold assembly 11, twisting the electrical wire leads 40 in a counterclockwise direction, filling the internal space with a potting compound, and re-installing the electrical connector 13 before the potting compound cures. This can be useful when the transducer assembly 10 is used in an explosive gas environment. No gas ingress is possible when the potting compound removes the internal atmosphere. Therefore, any shorts that may occur in the electronics cannot ignite a gas. Once the pressure transducer assembly 10 is potted, the transducer mounting plate 26 is permanently bonded to the pressure transducer housing 12 and the manifold valve assembly 11 and bolts 18 are no longer need to secure them together. The potted pressure transducer assembly can then be supplied as a stand-alone modular component as shown in FIGS. 5–8. Alternatively, if a stand-alone transducer assembly 10 is desired without potting compound, the transducer mounting plate 26 could be secured to the transducer housing 12 with a sealant such as a silicone RTV applied to the mounting plate lip 32 prior to assembly.

One preferred embodiment of the present invention comprises a method for assembling a pressure monitoring assembly comprising:

(A) providing a manifold valve assembly comprising:
  (1) a rigid manifold body having a first pressure inlet port and a second pressure inlet port, and a first pressure outlet port and a second pressure outlet port, wherein said first pressure inlet port and said first pressure outlet port are in parallel relationship with said second pressure inlet port and said second pressure outlet port, and wherein said outlet ports have a connection to a manifold body flange;
  (2) a first isolation valve in a fluid passageway between said first pressure inlet port and said first pressure outlet port, wherein said first isolation valve can be adjusted between an open position in which said first pressure inlet port and said first pressure outlet port are in communication through said fluid passageway, and a closed position in which said communication through said fluid passageway is stopped; and
  (3) a second isolation valve in said fluid passageway between said second pressure inlet port and said second pressure outlet port, wherein said second isolation value can be adjusted between an open position in which said second pressure inlet port and said second pressure outlet port are in communication through said fluid passageway and a closed position in which said communication through said fluid passageway is stopped;

(B) providing a pressure transducer assembly comprising:
  (1) a transducer mounting plate for attaching transducers;
  (2) a first transducer rigidly secured to a first transducer port in said transducer mounting plate;
  (3) a second transducer rigidly secured to a second transducer port in said transducer mounting plate in parallel relationship with said first transducer, wherein the spacing between said first transducer and said second transducer equals the outlet port spacing of said rigid manifold valve body; and
  (4) a pressure transducer housing having sides defining an enclosure which supports said transducer mounting plate and provides threaded holes for attachment to said manifold body flange;

(C) inserting said transducer mounting plate into the mating recess of said pressure transducer housing such that said transducer mounting plate extends beyond said pressure transducer housing; and (D) aligning said manifold valve assembly with said pressure transducer assembly such that the bolt holes in the manifold valve body flange align with said threaded holes in said pressure transducer housing; and (E) securing said pressure transducer assembly to said manifold valve assembly in a pressure tight and releasable manner with the use of bolts.

Another preferred embodiment of the present invention comprises a pressure monitoring assembly comprising:

(A) a manifold valve assembly comprising:
  (1) a rigid manifold body having a first pressure inlet port and a second pressure inlet port, and a first pressure outlet port and a second pressure outlet port, wherein said first pressure inlet port and said first pressure outlet port are in parallel relationship with said second pressure inlet port and said second pressure outlet port, and wherein said outlet ports have a connection to a manifold body flange;
  (2) a first isolation valve in a fluid passageway between said first pressure inlet port and said first pressure outlet port, wherein said first isolation valve can be adjusted between an open position in which said first pressure inlet port and said first pressure outlet port are in communication through said fluid passageway, and a closed position in which said communication through said fluid passageway is stopped; and
  (3) a second isolation valve in said fluid passageway between said second pressure inlet port and said second pressure outlet port, wherein said second isolation valve can be adjusted between an open position in which said second pressure inlet port and said second pressure outlet port are in communication through said fluid passageway and a closed position in which said communication through said fluid passageway is stopped; and (B) a pressure transducer assembly comprising:
  (1) a pressure transducer mounting plate for attaching transducers;
  (2) a first pressure transducer rigidly secured to a first transducer port in said pressure transducer mounting plate;
  (3) a second pressure transducer rigidly secured to a second transducer port in said pressure transducer mounting plate in parallel relationship with said first pressure transducer port, wherein the spacing between said first pressure transducer and said second pressure transducer equals the outlet port spacing of said manifold valve body flange;
  (4) a pressure transducer housing having sides defining an enclosure which supports said transducer mounting plate and provides threaded holes for attachment to said manifold valve body flange.

While specific embodiments are described and shown in the foregoing description and in the accompanying drawings, those skilled in the art will recognize that further modifications made in detail and form are possible without departing from the spirit and scope of the invention.

What is claimed is:

1. A method for assembling a pressure monitoring assembly comprising:

(A) providing a manifold valve assembly comprising:
  (1) a rigid manifold body having a first pressure inlet port and a second pressure inlet port, and a first pressure outlet port and a second pressure outlet port, wherein said first pressure inlet port and said first pressure outlet port are in parallel relationship with said second pressure inlet port and said second pressure outlet port, and wherein said outlet ports have a connection to a manifold body flange;

(2) a first isolation valve in a fluid passageway between said first pressure inlet port and said first pressure outlet port, wherein said first isolation valve can be adjusted between an open position in which said first pressure inlet port and said first pressure outlet port are in communication through said fluid passageway, and a closed position in which said communication through said fluid passageway is stopped; and (3) a second isolation valve in said fluid passageway between said second pressure inlet port and said second pressure outlet port, wherein said second isolation value can be adjusted between an open position in which said second pressure inlet port and said second pressure outlet port are in communication through said fluid passageway and a closed position in which said communication through said fluid passageway is stopped;

(B) providing a pressure transducer assembly comprising:
(1) a transducer mounting plate for attaching transducers;
(2) a first transducer rigidly secured to a first transducer port in said transducer mounting plate;
(3) a second transducer rigidly secured to a second transducer port in said transducer mounting plate in parallel relationship with said first transducer, wherein the spacing between said first transducer and said second transducer equals the outlet port spacing of said rigid manifold valve body; and
(4) a pressure transducer housing having sides defining an enclosure which supports said transducer mounting plate and provides threaded holes for attachment to said manifold body flange;

(C) inserting said transducer mounting plate into the mating recess of said pressure transducer housing such that said transducer mounting plate extends beyond said pressure transducer housing; and (D) aligning said manifold valve assembly with said pressure transducer assembly such that the bolt holes in the manifold valve body flange align with said threaded holes in said pressure transducer housing; and (E) securing said pressure transducer assembly to said manifold valve assembly in a pressure tight and releasable manner with the use of bolts.

2. A method of claim 1 wherein said manifold valve assembly comprises:
(A) an equalization fluid passageway formed in said rigid manifold body, said equalization fluid passageway allowing communication between said first pressure outlet port and said second pressure outlet port, and said equalization fluid passageway is upstream of said isolation valves; and
(B) an equalization valve in said equalization fluid passageway, said equalization value being adjustable between an open position in which said first pressure outlet port and said second pressure outlet port are in communication through said equalization fluid passageway, and a closed position in which said communication through said equalization fluid passageway is stopped.

3. A method of claim 2, wherein said manifold valve assembly comprises:
(A) a first bleed port passageway formed in said rigid manifold body, wherein said first bleed port passageway allows fluid communication between said first isolation valve and said first pressure outlet port;
(B) a second bleed port passageway formed in said rigid manifold body, wherein said second bleed port passageway allows fluid communication between said second isolation valve and said second pressure outlet port passageway;
(C) a first pressure bleed port plug installed in said first bleed port passageway; and
(D) a second pressure bleed port plug installed in said second bleed port passageway.

4. A method of claim 3, wherein said pressure transducer assembly comprises:
a first thermistor attached to said pressure transducer mounting plate and installed adjacent to said first transducer port;
a second thermistor attached to said transducer mounting plate and installed adjacent to said second transducer port.

5. A method of claim 4, wherein said pressure transducer assembly comprises:
a threaded port for an electrical connector located on a side of said pressure transducer housing, said port being sized to accept a panel mounted electrical connector; and
an electrical connector attached to said threaded port, wherein said electrical connector has electrical leads that connect said first pressure transducer and said second pressure transducer output signals respectively with first thermistor and second thermistor signals.

6. A method of claim 5 wherein said transducer mounting plate has a smooth, flat sealing surface extending about $\frac{1}{32}$" beyond the bolting face of said pressure transducer housing and is sized to cover o-ring grooves on said rigid manifold body, with the $\frac{1}{32}$" extension of said smooth, flat sealing surface ensuring that it is the only surface to contact said manifold body flange during assembly.

7. A method of claim 6 wherein, upon tightening said bolts, said transducer mounting plate is pulled toward said manifold body flange by the small contact area between the edge of a transducer housing recess and the lip of said transducer mounting plate, and said transducer mounting plate levels itself parallel with said manifold body flange because of the small amount of deformation induced on said transducer housing recess.

8. A method of claim 7 where said transducer mounting plate essentially floats or is sandwiched between seals with said manifold body flange and said transducer housing recess, thereby allowing the internal components of said pressure transducer assembly either to be accessed easily for repair or to be exchanged for alternate components by removing said pressure transducer assembly from said manifold body assembly.

9. A method of claim 8 wherein said pressure transducer assembly is converted into a differential pressure transmitter by incorporating a signal processing circuit into the interior space of said pressure transducer assembly.

10. A method of claim 9 where said pressure transducer assembly is fully potted for the purpose of rendering said pressure monitoring assembly explosion-proof.

11. A pressure monitoring assembly comprising:
(A) a manifold valve assembly comprising:
(1) a rigid manifold body having a first pressure inlet port and a second pressure inlet port, and a first pressure outlet port and a second pressure outlet port, wherein said first pressure inlet port and said first pressure outlet port are in parallel relationship with said second pressure inlet port and said second pressure outlet port, and wherein said outlet ports have a connection to a manifold body flange;

(2) a first isolation valve in a fluid passageway between said first pressure inlet port and said first pressure outlet port, wherein said first isolation valve can be adjusted between an open position in which said first pressure inlet port and said first pressure outlet port are in communication through said fluid passageway, and a closed position in which said communication through said fluid passageway is stopped; and (3) a second isolation valve in said fluid passageway between said second pressure inlet port and said second pressure outlet port, wherein said second isolation valve can be adjusted between an open position in which said second pressure inlet port and said second pressure outlet port are in communication through said fluid passageway and a closed position in which said communication through said fluid passageway is stopped; and (B) a pressure transducer assembly comprising:

(1) a pressure transducer mounting plate for attaching transducers;

(2) a first pressure transducer rigidly secured to a first transducer port in said pressure transducer mounting plate;

(3) a second pressure transducer rigidly secured to a second transducer port in said pressure transducer mounting plate in parallel relationship with said first pressure transducer port, wherein the spacing between said first pressure transducer and said second pressure transducer equals the outlet port spacing of said manifold valve body flange;

(4) a pressure transducer housing having sides defining an enclosure which supports said transducer mounting plate and provides threaded holes for attachment to said manifold valve body flange.

12. A pressure monitoring assembly of claim 11, wherein said manifold valve assembly comprises:

(A) an equalization fluid passageway formed in said rigid manifold body, said equalization fluid passageway allowing communication between said first pressure outlet port and said second pressure outlet port, and said equalization fluid passageway is upstream of said isolation valves; and (B) an equalization valve in said equalization fluid passageway, said equalization value being adjustable between an open position in which said first pressure outlet port and said second pressure outlet port are in communication through said equalization fluid passageway, and a closed position in which said communication through said equalization fluid passageway is stopped.

13. A pressure monitoring assembly of claim 12, wherein said manifold valve assembly comprises:

(A) a first pressure bleed port passageway formed in said rigid manifold body, wherein said first bleed port passageway allows fluid communication between said first isolation valve and said first pressure outlet port;

(B) a second pressure bleed port passageway formed in said rigid manifold body, wherein said second bleed port passageway allows fluid communication between said second isolation valve and said second pressure outlet port passageway;

(C) a first bleed port plug installed in said first bleed port passageway; and (D) a second bleed port plug installed in said second bleed port passageway.

14. A pressure monitoring assembly of claim 13, wherein said pressure transducer assembly comprises:

a first thermistor attached to said pressure transducer mounting plate and installed adjacent to said first transducer port;

a second thermistor attached to said transducer mounting plate and installed adjacent to said second transducer port.

15. A pressure monitoring assembly of claim 14, wherein said pressure transducer assembly comprises:

a threaded port for an electrical connector located on a side of said pressure transducer housing, said port being sized to accept a panel mounted electrical connector; and an electrical connector attached to said threaded port, wherein said electrical connector has electrical leads that connect said first pressure transducer and said second pressure transducer output signals respectively with first thermistor and second thermistor signals.

16. A pressure monitoring assembly of claim 15 wherein said transducer mounting plate has a smooth, flat sealing surface extending about $\frac{1}{32}$" beyond the bolting face of said pressure transducer housing and is sized to cover o-ring grooves on said rigid manifold body, with the $\frac{1}{32}$" extension of said smooth, flat sealing surface ensuring that it is the only surface to contact said manifold body flange during assembly.

17. A pressure monitoring assembly of claim 16 wherein, upon tightening said bolts, said transducer mounting plate is pulled toward said manifold body flange by the small contact area between the edge of a transducer housing recess and the lip of said transducer mounting plate, and said transducer mounting plate levels itself parallel with said manifold body flange because of the small amount of deformation induced on said transducer housing recess.

18. A pressure monitoring assembly of claim 17 where said transducer mounting plate essentially floats or is sandwiched between seals with said manifold body flange and said transducer housing recess, thereby allowing the internal components of said pressure transducer assembly either to be accessed easily for repair or to be exchanged for alternate components by removing said pressure transducer assembly from said manifold body assembly.

19. A pressure monitoring assembly of claim 18 wherein said pressure transducer assembly is converted into a differential pressure transmitter by incorporating a signal processing circuit into the interior space of said pressure transducer assembly.

20. A pressure monitoring assembly of claim 19 wherein said pressure transducer assembly is fully potted for the purpose of rendering said pressure monitoring assembly explosion-proof.

* * * * *